(12) United States Patent
Abedini et al.

(10) Patent No.: US 11,564,232 B2
(45) Date of Patent: Jan. 24, 2023

(54) AUTONOMOUS BEAMFORMING CONFIGURATION CHANGE

(71) Applicant: QUALCOMM Incorporated, San Diego, CA (US)

(72) Inventors: Navid Abedini, Basking Ridge, NJ (US); Kapil Gulati, Belle Mead, NJ (US); Andrzej Partyka, Bedminster, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 17/158,623

(22) Filed: Jan. 26, 2021

(65) Prior Publication Data

US 2021/0235457 A1 Jul. 29, 2021

Related U.S. Application Data

(60) Provisional application No. 62/967,385, filed on Jan. 29, 2020.

(51) Int. Cl.
*H04W 72/04* (2009.01)
*H04W 72/14* (2009.01)
(Continued)

(52) U.S. Cl.
CPC ........... *H04W 72/0493* (2013.01); *H04L 5/16* (2013.01); *H04W 72/042* (2013.01);
(Continued)

(58) Field of Classification Search
CPC ............. H04W 72/0493; H04W 76/27; H04W 72/042; H04W 72/046; H04W 72/14;
(Continued)

(56) References Cited

U.S. PATENT DOCUMENTS

2016/0381596 A1* 12/2016 Hu ........................ H04B 7/0617
370/236
2018/0375550 A1* 12/2018 Zhou .................... H04B 7/0686
(Continued)

OTHER PUBLICATIONS

International Search Report and Written Opinion—PCT/US2021/015243—ISA/EPO—dated May 14, 2021.
(Continued)

*Primary Examiner* — Mewale A Ambaye
(74) *Attorney, Agent, or Firm* — Patterson + Sheridan, L.L.P.

(57) ABSTRACT

Certain aspects of the present disclosure provide techniques for autonomous beamforming configuration change. A method that may be performed by a wireless node includes determining a communication mode to be used for communication by the wireless node, wherein the determining of the communication mode includes determining whether the communication is associated with multiple simultaneous communications with one or multiple other wireless nodes. The method may also include determining a beamforming configuration to be used for the communication based on the
(Continued)

communication mode, and communicating in accordance with the communication mode using the beamforming configuration.

51 Claims, 9 Drawing Sheets

(51) Int. Cl.
  *H04W 80/02* (2009.01)
  *H04L 5/16* (2006.01)
  *H04W 88/14* (2009.01)
  *H04W 76/27* (2018.01)

(52) U.S. Cl.
  CPC ......... *H04W 72/046* (2013.01); *H04W 72/14* (2013.01); *H04W 76/27* (2018.02); *H04W 80/02* (2013.01); *H04W 88/14* (2013.01)

(58) Field of Classification Search
  CPC ..... H04W 80/02; H04W 88/14; H04W 72/06; H04W 76/10; H04W 72/0426; H04W 72/0433; H04W 16/28; H04W 28/12; H04L 5/16
  See application file for complete search history.

(56) References Cited

U.S. PATENT DOCUMENTS

| | | | |
|---|---|---|---|
| 2019/0014533 A1 | 1/2019 | Abedini et al. | |
| 2019/0021108 A1* | 1/2019 | Hampel | H04W 72/0426 |
| 2019/0053193 A1* | 2/2019 | Park | H04W 56/0045 |
| 2019/0132805 A1* | 5/2019 | Abedini | H04W 52/46 |
| 2019/0132807 A1* | 5/2019 | Abedini | H04W 52/34 |
| 2019/0132847 A1* | 5/2019 | Abedini | H04W 52/38 |
| 2019/0140811 A1 | 5/2019 | Abedini et al. | |
| 2019/0394799 A1* | 12/2019 | Islam | H04W 74/0833 |
| 2020/0145997 A1* | 5/2020 | Luo | H04W 72/042 |

OTHER PUBLICATIONS

Qualcomm Incorporated: "Beam Management for NR", 3GPP Draft, 3GPP TSG-RAN WG1 Meeting 93, R1-1807341 Beam Management For NR, 3rd Generation Partnership Project (3GPP), Mobile Competence Centre, 350, Route Des Lucioles, F-06921 Sophia-Antipolis Cedex, France, vol. RAN WG1, No. Busan, Korea, May 21, 2018-May 25, 2018, May 20, 2018 (May 20, 2018), XP051442533, pp. 1-11.

* cited by examiner

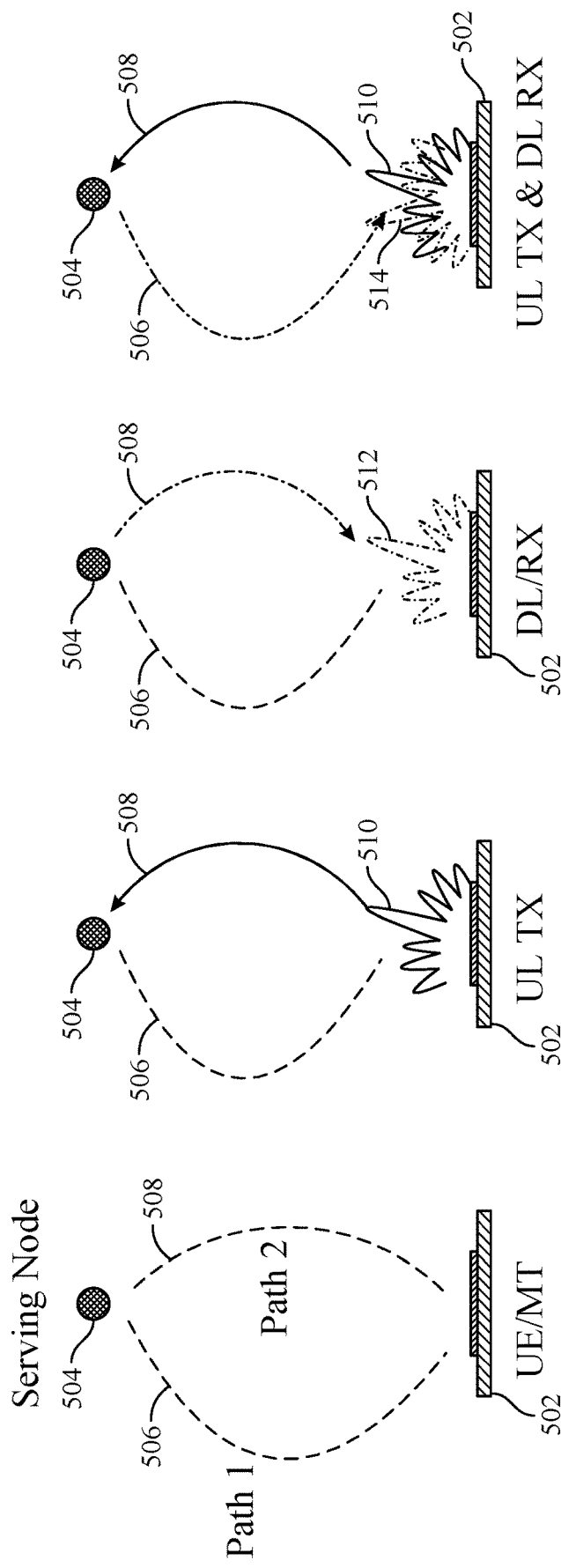

MT RX/ DU RX

MT TX/ DU TX

MT TX/ DU RX

MT RX/ DU TX

MT RX/ MT RX

MT TX/ MT TX

MT TX/ MT RX

MT RX/ MT TX

AUTONOMOUS BEAMFORMING CONFIGURATION CHANGE

CROSS-REFERENCE TO RELATED APPLICATION

This application claims benefit of and priority to U.S. Provisional Application No. 62/967,385, filed Jan. 29, 2020, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for beamforming.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved configuration of beamforming.

Certain aspects of the subject matter described in this disclosure can be implemented in a method for wireless communication. The method generally includes: determining a communication mode to be used for communication by the wireless node, wherein the determining of the communication mode includes determining whether the communication is associated with multiple simultaneous communications with one or multiple other wireless nodes; determining a beamforming configuration to be used for the communication based on the communication mode; and communicating in accordance with the communication mode using the beamforming configuration.

Certain aspects of the subject matter described in this disclosure can be implemented in an apparatus for wireless communication by a wireless node. The apparatus generally includes a memory and a processor coupled to the memory, the memory and the processor being configured to determine a communication mode to be used for communication by the wireless node. The processor and the memory are further configured to determine the communication mode by determining whether the communication is associated with multiple simultaneous communications with one or multiple other wireless nodes. The processor and the memory are further configured to determine a beamforming configuration to be used for the communication based on the communication mode, and communicate in accordance with the communication mode using the beamforming configuration.

Certain aspects of the subject matter described in this disclosure can be implemented in an apparatus for wireless communication by a wireless node. The apparatus generally includes: means for determining a communication mode to be used for communication by the wireless node, wherein the means for determining the communication mode includes means for determining whether the communication is associated with multiple simultaneous communications with one or multiple other wireless nodes; means for determining a beamforming configuration to be used for the communication based on the communication mode; and means for communicating in accordance with the communication mode using the beamforming configuration.

Certain aspects of the subject matter described in this disclosure can be implemented in a non-transitory computer-readable medium having instructions stored to cause a wireless node to: determine a communication mode to be used for communication by the wireless node, wherein the instructions further cause the wireless node to determine the communication mode by determining whether the communication is associated with multiple simultaneous communications with one or multiple other wireless nodes; determine a beamforming configuration to be used for the communication based on the communication mode; and communicate in accordance with the communication mode using the beamforming configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 5A-5D illustrate communication using full-duplex and half-duplex modes.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
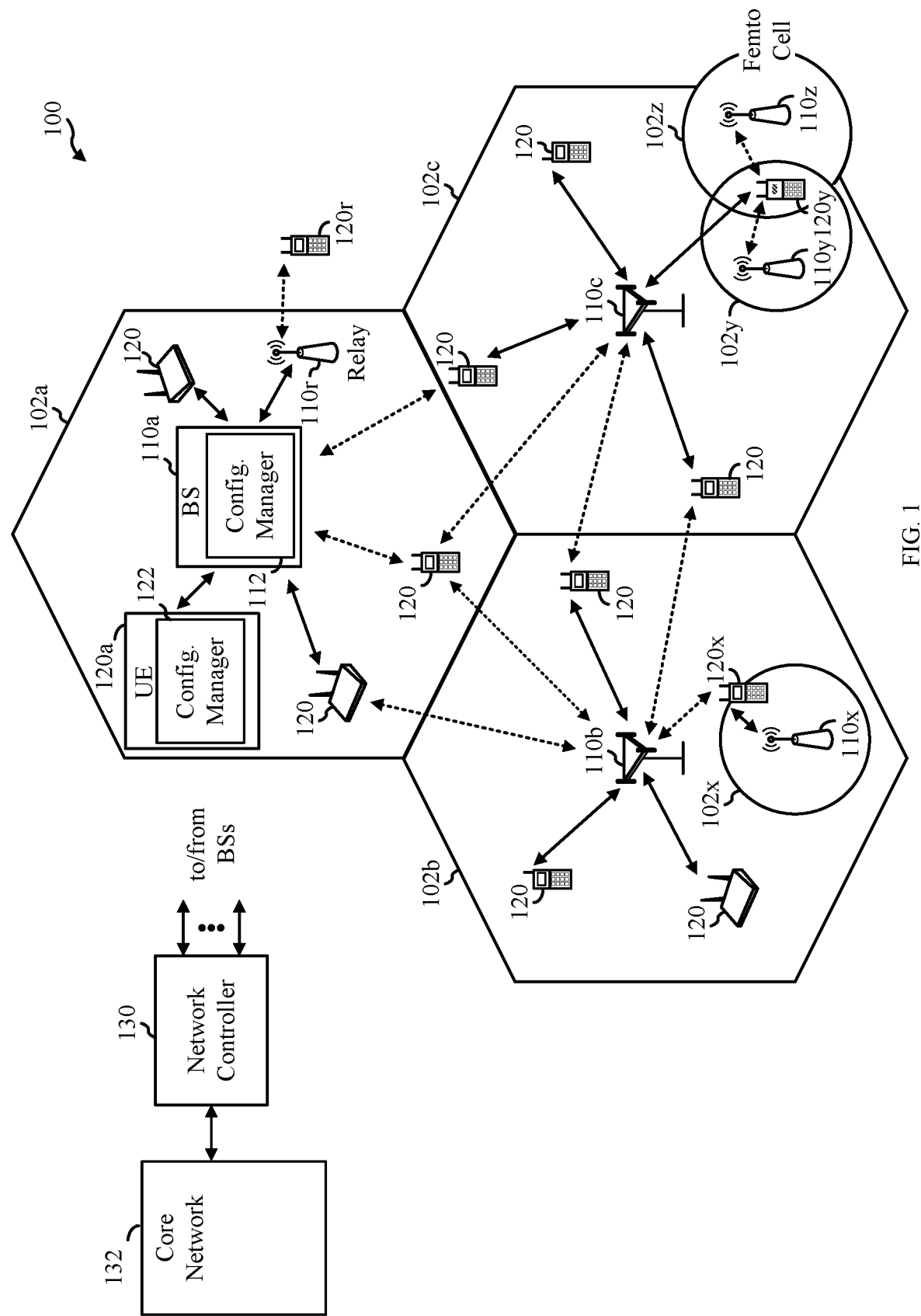
FIG. 1 is a block diagram conceptually illustrating an example telecommunications system, in accordance with certain aspects of the present disclosure.

Aspects of the present disclosure provide apparatus, methods, processing systems, and computer-readable mediums for autonomous configuration of beamforming. For example, a wireless node may determine one or more beamforming configurations to be used for one or more communications based on at least one communication mode and at least one rule configured at the wireless node. In one example, a UE may determine that a full-duplex mode is to be used for a particular communication and autonomously (e.g., without having to receive a configuration from a base station) determine a beamforming configuration to be used for the communication. The configured at least one rule may map the at least one communication mode to one or more beamforming configurations to be used. In certain implementations, a configured rule may indicate priorities associated with different communications and the priorities may be considered when determining a beamforming configuration to be used, as described in more detail herein. The aspects described herein improve communication efficiency by allowing a UE to autonomously select a beamforming configuration to be used without an express indication of the beamforming configuration from the base station.

The following description provides examples of techniques for beamforming configuration in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for configuration of beamforming. As shown in FIG. 1, the UE 120a includes a configuration manager 122, and the BS 110 may include a configuration manager 112. The configuration manager 112 or configuration manager 122 may be configured to determine a communication mode to be used for communication by the wireless node, determine a beamforming configuration to be used for the communication based on the communication mode and a rule configured at the wireless node, and communicate in accordance with the communication mode using the beamforming configuration, in accordance with aspects of the present disclosure.

Figure 2:
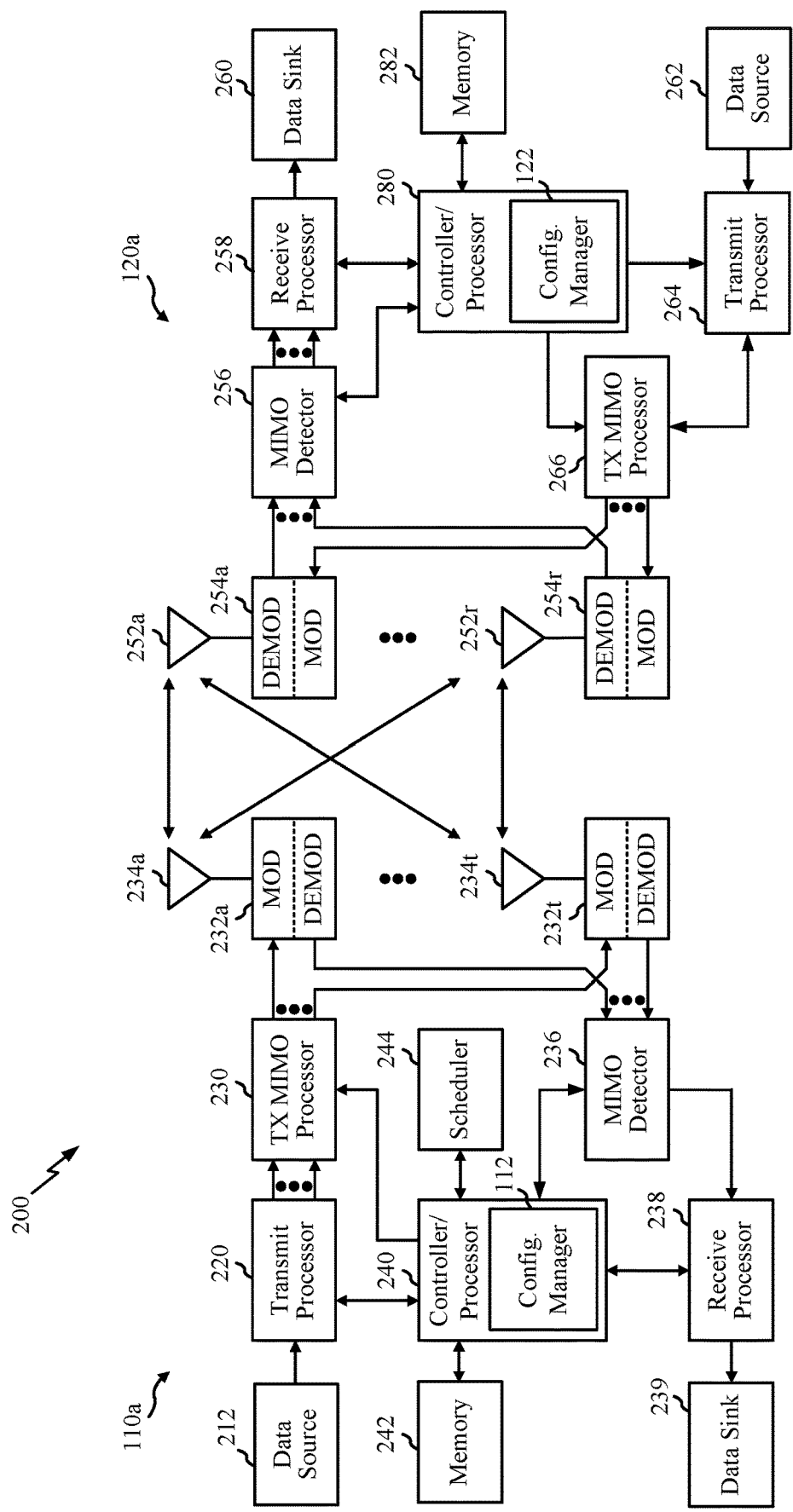
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has the configuration manager 122, the controller/processor 240 of the BS 110 may include the configuration manager 112, according to aspects described herein. Although shown at the controller/processor, other components of the UE 120a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
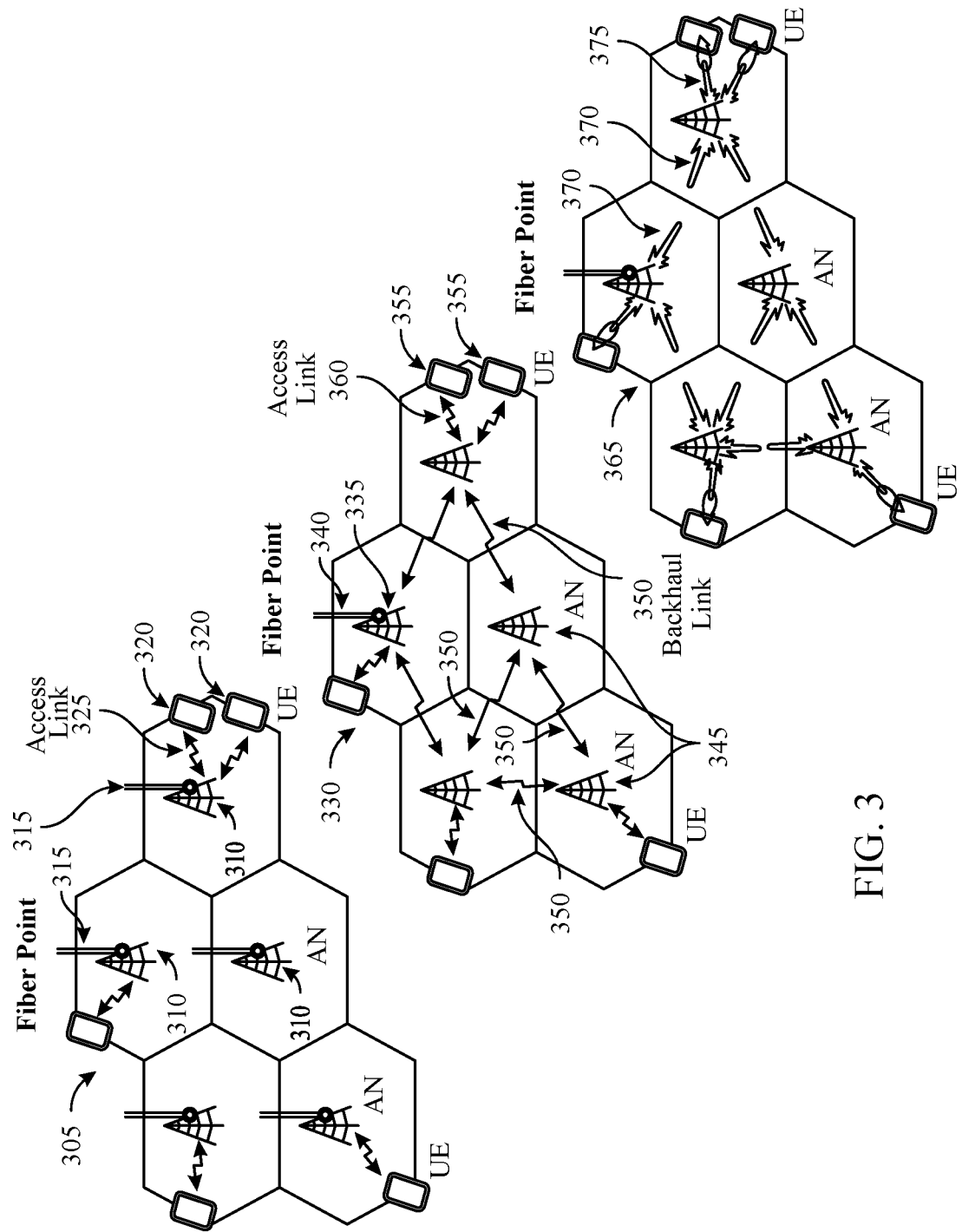
FIG. 3 is a diagram illustrating examples of radio access networks, in accordance with various aspects of the disclosure.

FIG. 3 is a diagram illustrating examples of radio access networks, in accordance with various aspects of the disclosure.

As shown by reference number 305, a traditional (for example, 3G, 4G, LTE) radio access network may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network. In some aspects or scenarios, a wireless backhaul network may sometimes be referred to as an integrated access and backhaul (IAB) network. An IAB network may include multiple base stations and sometimes the base stations may be of differing types or have differing operational characteristics. For example, in some aspects, an IAB network may have at least one base station that is an anchor base station 335. The anchor base station may communicate with a core network via a wired backhaul link 340, such as a fiber connection. An anchor base station 335 may also be referred to as an IAB donor. An IAB donor is an access node with wireline connection to a core network. An IAB node is an access node that relays traffic from/to an Anchor through one or multiple hops. Anchor base stations can be configured to communicate with other types of base stations or other communication devices (e.g. in a radio network or IAB network).

The IAB network may also include one or more non-anchor base stations 345. Non-anchor base stations may be referred to as relay base stations or IAB nodes. The non-anchor base station 345 may communicate directly with or indirectly with (for example, via one or more other non-anchor base stations 345) the anchor base station 335 via one or more backhaul links 350 to form a backhaul path to the core network for carrying backhaul traffic. Backhaul link 350 may be a wireless link. Anchor base station(s) 335 or non-anchor base station(s) 345 may communicate with one or more UEs 355 via access links 360, which may be wireless links for carrying access traffic. In some aspects, an anchor base station 335 or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize a variety of spectrum types. For example, an IAB network may use a variety of differing radio frequency bands. In a few particular examples and according to some aspects, millimeter wave technology or directional communications can be used (for example, beamforming, precoding) for communications between base stations or UEs (for example, between two base stations, between two UEs, or between a base station and a UE). In additional or alternative aspects or examples, wireless backhaul links 370 between base stations may use millimeter waves to carry information or may be directed toward a target base station using beamforming, precoding. Similarly, the wireless access links 375 between a UE and a base station may use millimeter waves or may be directed toward a target wireless node (for example, a UE or a base station). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with base station 110 for that IAB node, and an MT of an IAB node may perform functions described in connection with UE 120 for that IAB node.

Figure 4:
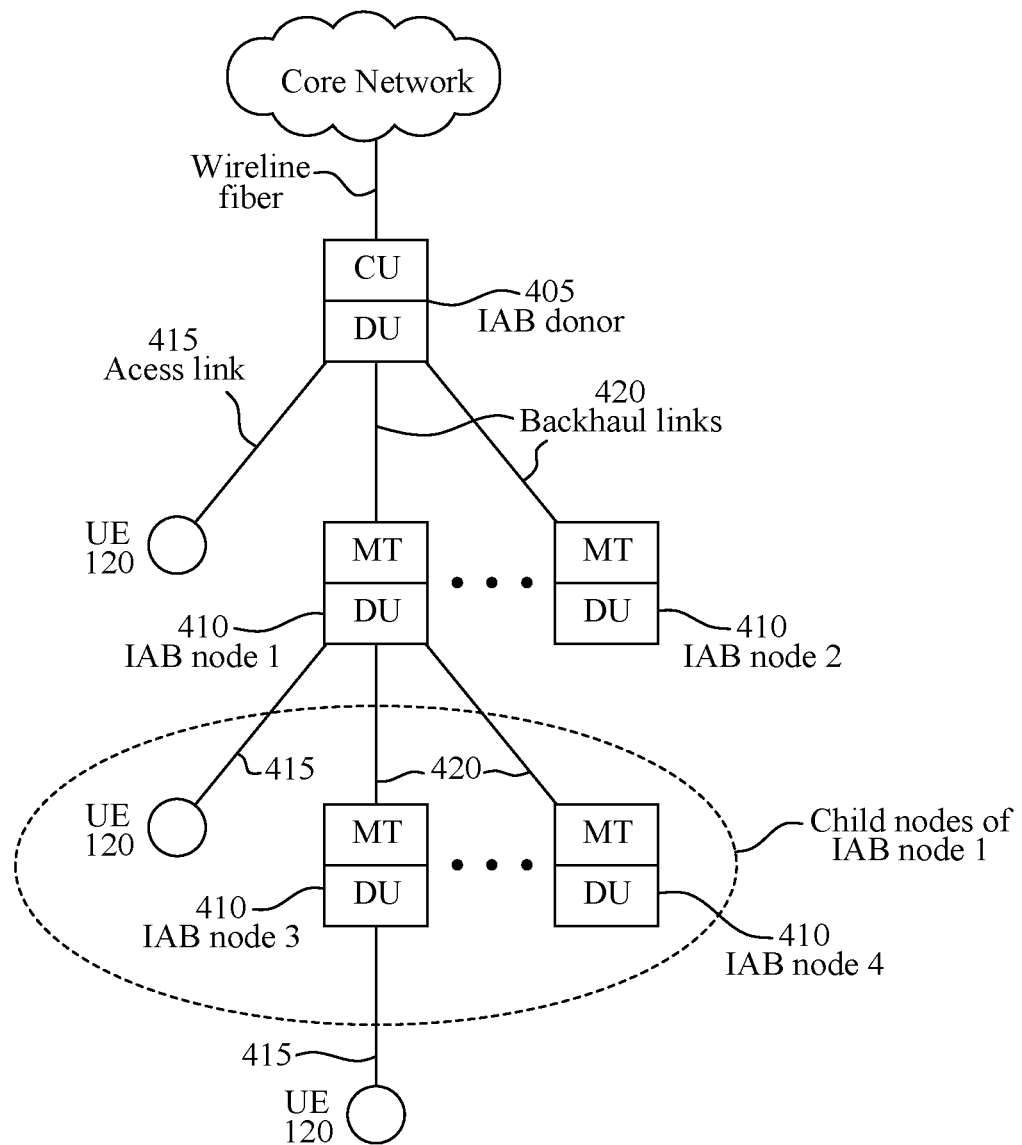
FIG. 4 is a diagram illustrating an example of an integrated access and backhaul (IAB) network architecture, in accordance with various aspects of the disclosure.

FIG. 4 is a diagram illustrating an example of an IAB network architecture, in accordance with various aspects of the disclosure. As shown in FIG. 4, an IAB network may include an IAB donor 405 that connects to a core network via a wired connection (for example, as a wireline fiber). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a CU, which may perform AMF functions. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message, an F1 application protocol (F1AP) message).

As described above, the IAB network may include IAB nodes 410 (shown as IAB nodes 1 through 4) that connect to the core network via the IAB donor 405. As shown, an IAB node 410 may include an MT and may include a DU.

The MT of an IAB node 410 (for example, a child node) may be controlled or scheduled by another IAB node 410 (for example, a parent node) or by an IAB donor 405. The DU of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include a DU and not an MT. That is, an IAB donor 405 may configure, control, or schedule communications of IAB nodes 410 or UEs 120. A UE 120 may include only an MT, and not a DU. That is, communications of a UE 120 may be controlled or scheduled by an IAB donor 405 or an IAB node 410 (for example, a parent node of the UE 120).

According to some aspects, certain nodes may be configured to participate in control/scheduling processes. For example in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between a UE 120 and an IAB donor 405, or between a UE 120 and an IAB node 410, may be referred to as an access link 415. Each access link 415 may be a wireless access link that provides a UE 120 with radio access to a core network via the IAB donor 405, and potentially via one or more IAB nodes 410.

As further shown in FIG. 4, a link between an IAB donor 405 and an IAB node 410, or between two IAB nodes 410, may be referred to as a backhaul link 420. Each backhaul link 420 may be a wireless backhaul link that provides an IAB node 410 with radio access to a core network via the IAB donor 405, and potentially via one or more other intermediate IAB nodes 410. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB nodes (for example, non-anchor base stations) are stationary (that is, non-moving). Next generation (5G) wireless networks have stated objectives to provide ultra-high data rate and support wide scope of application scenarios. Integrated access and backhaul (IAB) systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

There are various possible architectures for IAB-nodes, including layer-2 (L2) and layer-3 (L3) solutions and a particular architecture deployed may depend on what layers of protocol stack are implemented in the intermediate nodes (IAB-nodes), for example, L2 relays may implement PHY/MAC/RLC layers.

As described herein, an IAB donor may be an enhanced gNB node with functions to control IAB-network. A CU may refer to the central entity that controls the entire IAB-network through configuration. The CU holds RRC/PDCP layer functions. A DU may be a scheduling node that schedules child nodes of this IAB-donor. The DU holds RLC/MAC/PHY layer functions. An IAB-node is a L2 relay node consisting of MT and DU functions, as described herein. MT is a scheduled node similar to UE scheduled by its parent IAB-node or IAB-donor. A DU is a scheduling node that schedules child nodes of this IAB-node.

In some implementations, communication efficiency may be increased using beamforming. When beamforming is implemented, an array of antennas may be steered to transmit radio signals in a specific direction. The antenna arrays that use beamforming send/receive a relatively strong beam of signals in a specific direction. To implement beamforming, each antenna element may be provided a separate signal to be transmitted. The phase and amplitude of each signal may be controlled such that the transmitted signals by the antenna elements are added constructively and destructively so that they concentrate the signal into a narrow beam or lobe.

Example Techniques for Autonomous Beam Configuration Change

Certain aspects of the present disclosure are directed to autonomous configuration of beamforming. For example, a wireless node may determine a beamforming configuration to be used for a communication based on a mode of the communication and a rule configured at the wireless node. For instance, a UE/MT may determine that a full-duplex mode or a half-duplex mode is to be used for a particular communication, and automatically (e.g., without having to receive a configuration from a network entity) determine a beamforming configuration to be used for the communication. In certain aspects, the configured rule may map candidate communication modes to beamforming configurations to be used or may indicate priorities associated with different communications and the priorities may be considered when determining the beamforming configuration to be used, as described in more detail herein.

In new radio (NR), what beam/precoding a user-equipment (UE) (or an integrated access and backhaul (IAB)-node mobile terminal (MT)) uses for downlink (DL) reception (RX) or uplink (UL) transmission (TX) may be explicitly controlled by a base station (e.g., gNB) (or any parent-node). For DL, the beam/precoding may be configured via a Transmission Configuration Indicator (TCI) that may be transmitted by a base station (BS) to a UE. For instance, for a physical downlink shared channel (PDSCH), the demodulation reference signal (DMRS) for the PDSCH and the PDSCH itself may use the same precoding. Downlink control information (DCI) may be used to indicate the TCI state. For example, the TCI may indicate to the UE to use one out of M configured states, M being an integer greater than one. The TCI may indicate a quasi-co location (QCL) relation between the DMRS of the PDSCH (e.g., DMRS port groups) and some other signaling such as channel state information (CSI)-reference signal (RS) or synchronization signal block (SSB). Signals may be quasi-co located if the properties of one signal (e.g., DMRS) can be inferred from properties of another (e.g., CSI-RS or SSB). If the scheduling offset between a physical downlink control channel (PDCCH) and PDSCH is less than N slots (N being an integer greater than one), the same TCI state may be used for PDSCH as is used for DCI.

For PDCCH, the QCL may be configured for each control resource set (CORESET). In NR, a CORESET generally refers to a set of physical resources and a set of parameters that may be used for communication of PDCCH/DCI. Thru TCI state configuration, radio resource control (RRC) may be used to configure multiple TCI states for each CORESET at the UE. Then, a medium access control (MAC)-control element (CE) may be used to indicate which TCI state is activated by transmitting an index associated with the TCI state to be activated. If no QCL is configured, the CORESET may be assumed to be QCL'ed with SSB, in certain implementations.

For UL, spatial relation information may be indicated (e.g., via a spatialRelationInfo parameter) for PUCCH. For instance, the BS may indicate whether the PUCCH is QCL'ed with SSB, CSI-RS or sounding reference signal (SRS). For PUSCH, the DMRS for PUSCH and the PUSCH itself may use the same precoding.

In some cases, codebook-based precoding may be implemented. For example, DCI may be used to provide precoding information and antenna ports (e.g., antenna port of a configured SRS) via an SRS resource indicator (SRI). For non-codebook-based implementations, PUSCH may use the same precoding device that is used for a configured SRS (e.g., as indicated via SRI).

In some cases, there may be multiple TX/RX beam candidates for communication between a UE/MT and its serving gNB/parent-node. In some scenarios, the active TX/RX beam may be changed frequently. Therefore, having to send a new indication to change the beamforming configuration, such as TCI state, SRI, or spatial relation information, may be wasteful, and result in added communication latency because the new configuration has to be sent by the BS and received, processed, and adopted by the UE. Certain aspects of the present disclosure provide techniques for autonomous change of beamforming configuration based on various communication modes.

FIGS. 5A-5D illustrate communication using full-duplex and half-duplex modes. As illustrated in FIG. 5A, multiple paths 506, 508 may be present between a UE/MT 502 and a serving node 504. For example, the path 508 may be stronger than the path 506. As illustrated in FIG. 5B, UL Tx from the UE/MT 502 to the serving node 504 via Tx beam 510 may be implemented using a half-duplex mode (e.g., UL Tx only). As illustrated in FIG. 5C, DL Rx from the serving node 504 to the UE/MT 502 via Rx beam 512 may be implemented using a half-duplex mode (e.g. DL Rx only).

A UE/MT may have full-duplex capability, and may simultaneously transmit to and receive from serving gNB/parent-node, in some cases. For example, as illustrated in FIG. 5D, full-duplex mode may be used to perform simultaneous UL Tx via Tx beam 510 and DL Rx via Rx beam 514. As used herein, simultaneous communication generally refers to communications that at least partially overlap in the time-domain. When UE/MT communicates with the serving node in a half-duplex mode (e.g., only TX, or only RX), the UE/MT may use a different TX/RX beam as compared to the case when the UE/MT is communicating in a full-duplex mode. In certain aspects of the present disclosure, the various modes of operations for communication using half-duplex and full-duplex modes may be considered for autonomous adjustment of a beam/TCI state.

In some cases, a beam may be modified when using full-duplex communication due to null-forming. Null-forming generally refers to an adjustment of beam shape to suppress some sidelobes associated with communication to prevent (or at least reduce) interference.

Figure 6C:
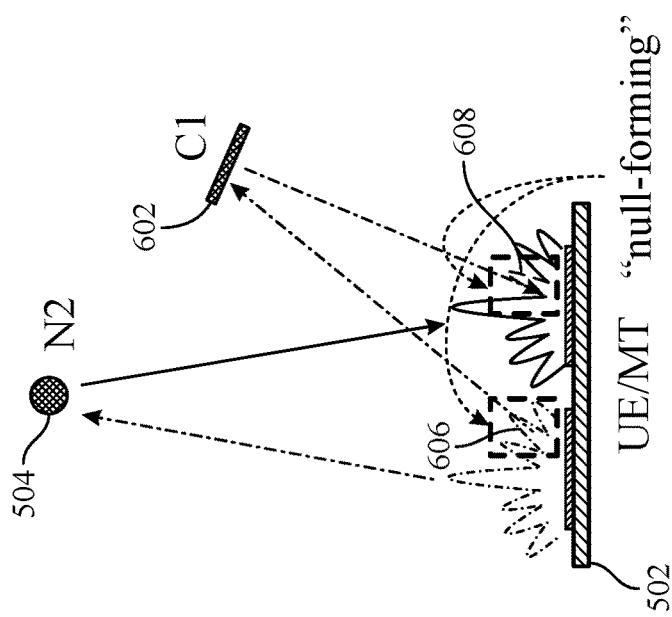
FIGS. 6A-6C illustrate a communication protocol using null-forming.
Figure 6B:
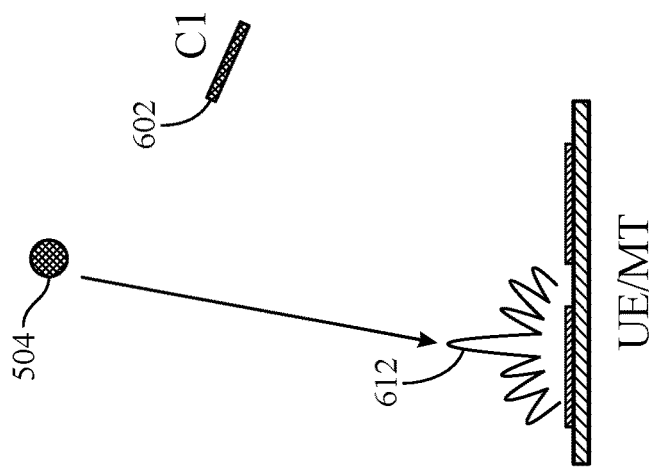
Figure 6A:
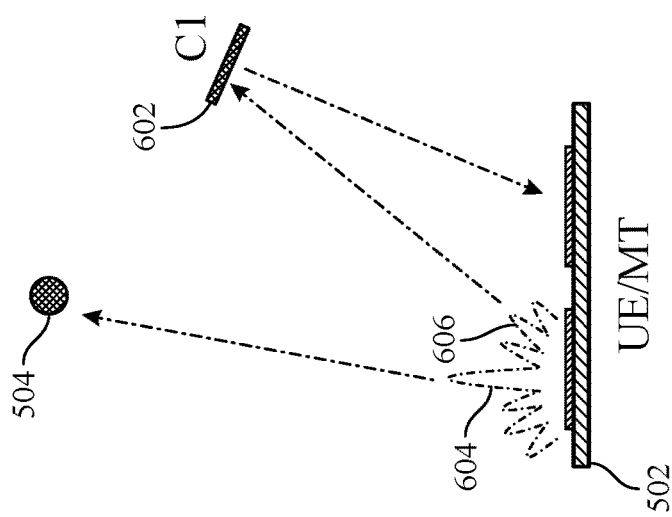

FIGS. 6A, 6B, 6C illustrate communication protocols using null-forming. As illustrated in FIG. 6B, a serving node 504 may transmit a signal to the UE/MT 502 which may be received via the Rx beam 612. As illustrated in FIG. 6A, the UE/MT 502 may transmit a signal to the serving node 504 via beam 604. In this case, a signal from a sidelobe 606 may reflect off of an object 602 (e.g., wall) back to the UE/MT 502. For example, the reflection from object 602 may interfere with another antenna array of the UE/MT 502. As illustrated in FIG. 6C, one antenna array of the UE/MT may be used to transmit a signal to the serving node 504, while another antenna array may be used to receive a signal from the serving node. As described herein, the signal from the sidelobe 606 may reflect from the object 602 and interfere with the other antenna array used for reception by the UE/MT 502. In other words, the reflection may be received via the Rx sidelobe 608. Thus, null-forming may be used to suppress the sidelobes 606, 608 to reduce the interference (e.g., reduce the transmission power via the sidelobe 606 and the reception gain via the sidelope 608).

Figure 7A:
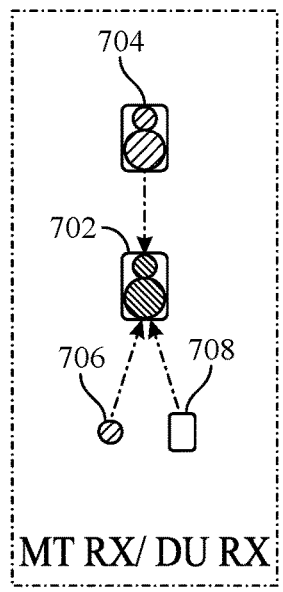
FIGS. 7A-7D and 8A-8D illustrate different modes of operation of an IAB-node.
Figure 7B:
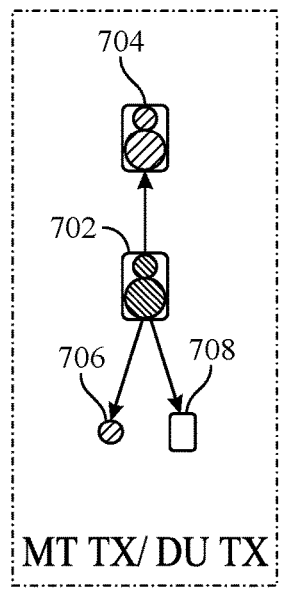
Figure 7C:
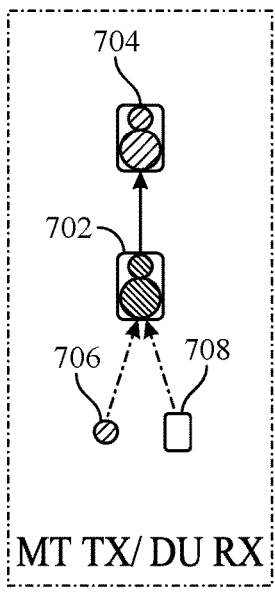
Figure 7D:
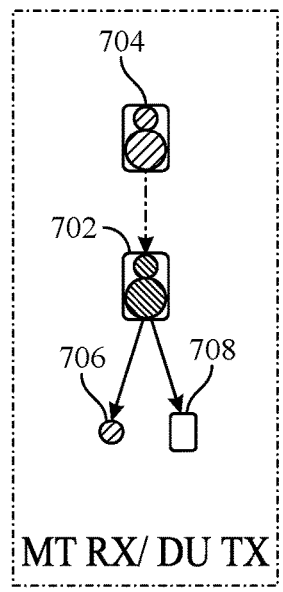

FIGS. 7A, 7B, 7C, 7D illustrate different modes of operation of an IAB-node 702. The IAB-node 702 may be simultaneously communicating over a back haul (BH)-link (e.g., towards its parent), and child-link (e.g., towards its child-node). For example, the MT and the DU of the IAB-node 702 may be receiving signals from the parent node 704 and child nodes 706, 708, as illustrated in FIG. 7A, or may be transmitting signals to the parent node 704 and child nodes 706, 708, as illustrated in FIG. 7B. As illustrated in FIG. 7C, the MT of the IAB-node 702 may be transmitting signals to the parent node 704 and the DU of the IAB-node 702 may be receiving signals from the child nodes 706, 708. As illustrated in FIG. 7D, the MT of the IAB-node 702 may be receiving signals from the parent node 704 and the DU of the IAB-node 702 may be transmitting signals to the child nodes 706, 708. The choice of proper beams to be used for communication over the BH-link may depend on whether an IAB-node is performing a simultaneous communication over its child-link(s) or not, and in case it does, which of the above modes described with respect to FIGS. 7A-D is adopted when communicating. In certain aspects of the present disclosure, a UE/MT may automatically adopt a beamforming configuration based on selecting one of the modes described with respect to FIGS. 7A-D.

Figure 8A:
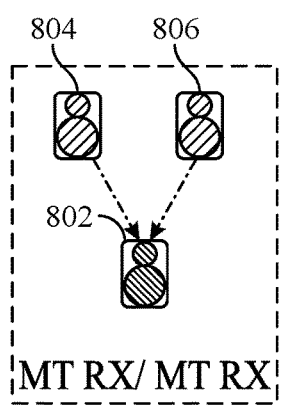
Figure 8B:
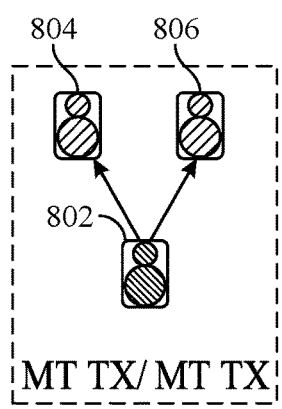
Figure 8C:
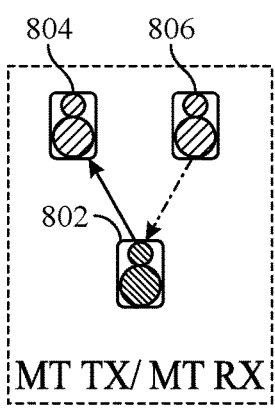
Figure 8D:
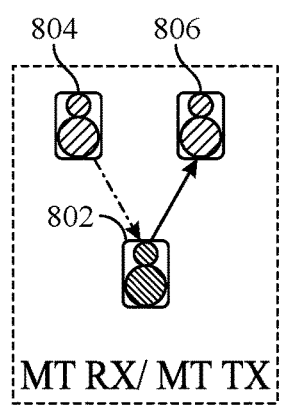

FIGS. 8A-8D illustrate different modes of operation of a UE/MT 802. A UE/MT may be connected to two cells/parent nodes 804, 806 in the same band and support simultaneous communications with both serving nodes. For example, as illustrated in FIG. 8A, the MT 802 may be receiving signals from both parent nodes 804, 806. As illustrated in FIG. 8B, the MT 802 may be transmitting signals to both parent nodes 804, 806. As illustrated in FIG. 8C, the MT 802 may transmit signals to the parent node 804 and receive signals from the parent node 806, or as illustrated in FIG. 8D, the MT 802 may receive signals from the parent node 804 and transmit signals to the parent node 806. Depending on the schedule for the signaling and mode of operation, the choice of beams that may be used for the signaling may differ and be adopted automatically by a UE/MT, in accordance with certain aspects of the present disclosure.

In certain aspects of the present disclosure, a UE/MT and its scheduling node(s) (e.g., parent nodes) may adopt beamforming for their communications. Each node (or at least one of them) may individually determine the communication mode. Based on the determined communication mode and a preconfigured rule, each node (or at least one of them) may adjust its beamforming configuration for an upcoming TX/RX, as described in more detail herein.

Figure 9:
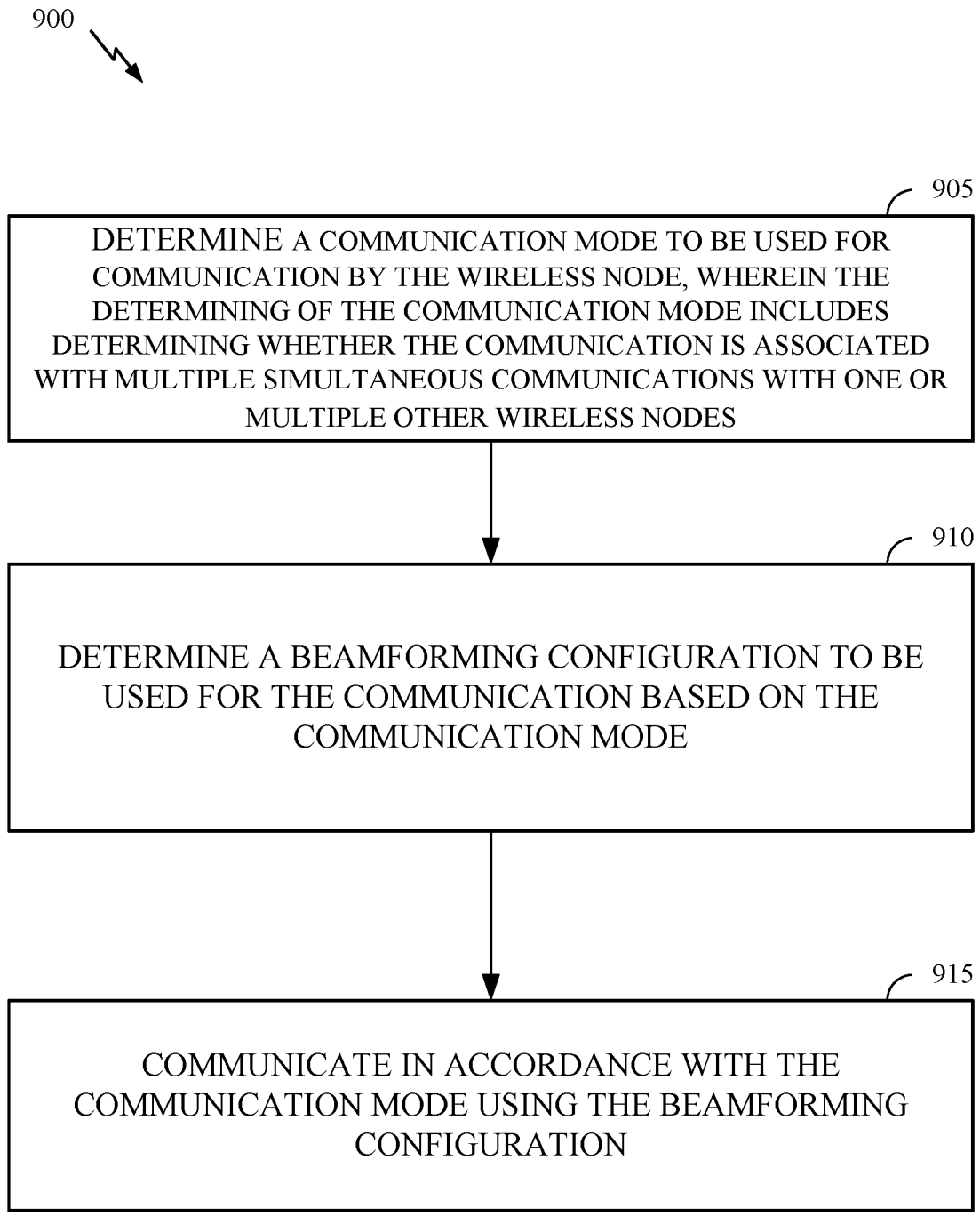
FIG. 9 is a flow diagram illustrating example operations for wireless communication, in accordance with certain aspects of the present disclosure.

FIG. 9 is a flow diagram illustrating example operations 900 for wireless communication, in accordance with certain aspects of the present disclosure. The operations 900 may be performed, for example, by a wireless node, such as a UE (e.g., a UE 120a (e.g., UE/MT) in the wireless communication network 100) or a BS (e.g., BS 110a in the wireless communication network 100).

Operations 900 may be implemented as software components that are executed and run on one or more processors (e.g., controller/processor 240 of FIG. 2, or controller/processor 280 of FIG. 2). Further, the transmission and reception of signals may be enabled, for example, by one or more antennas (e.g., antennas 234 of FIG. 2 or antennas 252 of FIG. 2). In certain aspects, the transmission and/or reception of signals may be implemented via a bus interface of one or more processors (e.g., controller/processor 240 or controller/processor 280) obtaining and/or outputting signals.

The operations 900 may begin, at block 905, with the wireless node determining a communication mode to be used for communication by the wireless node. The determining at block 905 may include determining whether the communication is associated with multiple simultaneous communications with one or multiple other wireless nodes.

At block 910, the wireless node determines a beamforming configuration to be used for the communication based on the communication mode. In some aspects, the beamforming configuration may be determined further based on a rule (also referred to herein as a preconfigured rule) configured at the wireless node. In certain aspects, operations 900 may also include adjusting a previous beamforming configuration based on the determined beamforming configuration to be used for the communication.

At block 915, the wireless node communicates in accordance with the communication mode using the beamforming configuration. For example, the wireless node may communicate control information or data using the beamforming configuration.

In certain aspects, determining the communication mode may include determining whether the communication comprises one of a single or multiple simultaneous communications with one or multiple other wireless nodes using the same frequency band. In other words, the communication may include a single simultaneous communication (e.g., reception and transmission) with a single wireless node. For instance, the UE/MT may determine to communicate with its parent-node in half or full-duplex mode (e.g., as described with respect to FIG. 5D or FIG. 6C).

In certain aspects, the UE/MT may determine the communication mode based on any of the received schedules (e.g., semi-static scheduling or dynamic scheduling), time division duplex (TDD) configuration or slot format, or any other configured parameters. For example, UE/MT may be configured semi-statically to receive a DL channel (e.g., a physical downlink control channel (PDCCH)). On some overlapping resources, UE/MT may then be scheduled (e.g., dynamically, such as via downlink control information (DCI)) to send an UL signal/channel. Thus, to support the communication using the overlapping resources, the default beam for PDCCH monitoring may be autonomously and temporarily changed upon receiving a configuration (e.g., via DCI) scheduling the UL signal or channel. In other words, instead of receiving signaling from the parent node to configure a new beam, the UE may automatically adjust the beam to be used based on the new mode of operation that is configured to support the communication using the overlapping resources. The change in the beam may be temporary to support the communication using the overlapping resources and may be automatically reverted to a previous beam after the communication.

In certain aspects, determining the communication mode may include determining whether the communication comprises multiple simultaneous communications with multiple other wireless nodes using the same frequency band. For example, the UE/MT may communicate with two parent-nodes in the same band simultaneously (e.g., as described with respect to FIGS. 8A-8D). A UE/MT or the parent-nodes may determine the communication mode based on the resources allocated for the communication, the schedules or configuration (e.g., that may be shared among them) for the communication, or any combination thereof. For example, there may be a first set of resources that are exclusively allocated to parent node 804 (e.g., not available to parent node 806), and a second set of resources that are allocated to both parent nodes 804, 806 for communication with the UE/MT 802 (e.g., simultaneous communication with the UE/MT 802). Different beams may be used for the first communication with the parent node 804 than the second communication with both the parent nodes 804, 806, as determined based on the type of resources that are allocated.

In certain implementations, the beam to be used may be further dependent on the type of simultaneous communications being used, such as spatial division multiplexed (SDM)-RX, SDM-TX, full-duplex TX and RX (e.g., TX to parent node 804 and RX from parent node 806), or full-duplex RX and TX (e.g., RX from parent node 804, and TX to parent node 806). For example, the type of simultaneous communications may include simultaneous transmissions to one or multiple other wireless nodes (e.g., as illustrated in FIG. 7B), simultaneous receptions from one or multiple other wireless nodes (e.g., as illustrated in FIG. 7A), or simultaneous transmissions to a first subset of the one or multiple other wireless nodes and simultaneous receptions from a second subset of the one or multiple other wireless nodes (e.g., as illustrated in FIG. 7C, or FIG. 7D). In some cases, at least one of the other wireless nodes may be common to both the first subset and the second subset. For example, a wireless node may be part of both the first and second subsets of wireless nodes. In some cases, all wireless nodes in the first subset may part of the second subset of wireless nodes.

As described herein, an IAB-node may communicate with a parent-node and its child nodes in the same band simultaneously, as described with respect to FIGS. 7A-7D. The IAB-node or the parent-node may determine the communication mode based on the resources allocated for the communication, the schedules (e.g., scheduling grant) or configuration (e.g., slot format configuration) for the communication, or any combination thereof. Some of the configurations, resources, or schedules may be shared among the IAB-node and parent node. There may be a first set of resources that are exclusively allocated to parent node 704 (e.g., not available to IAB-node 702), and a second set of resources that are allocated to both the parent node 704 and the IAB-node 702 (e.g., for simultaneous communication by the IAB-node with the parent node 704 and a child node). Different beams may be used for the first communication with the parent-node using the first resources compared to a second communication using the second resources, determined based on the type of allocated resources. Determining the beam to be used might further depend on the type of simultaneous communications being used (SDM-RX, SDM-TX, full-duplex TX and RX, full-duplex RX and TX).

As described herein, the beamforming configuration may be adjusted based on a preconfigured rule. For example, different sets of beams (e.g., TCIs, SRIs, precoding matrices, spatial relation information) may be configured and associated with different communication modes. The different sets of beams and their association with the modes of operation may be configured via RRC signaling, MAC-CE, DCI, or any combination thereof. In one example, and in case of simultaneous communication, one communication may have a higher priority than another, and the changes to the beamforming configuration may be applied only to the communication with the lower priority (e.g., one of the simultaneous communications having the lowest priority). This may reduce the impact on the higher priority communication. For instance, if UL transmission has a higher priority than DL reception, the beam used for UL transmission may be adjusted without adjusting a beam used for DL reception in order for the DL reception not to impact the higher priority UL transmission.

In some aspects, priority may be defined based on the type of communication or signals. For example, priority may be defined based on whether the communication is for ultra-reliable low-latency communication (URLLC) vs. enhanced mobile broadband (eMBB). In other words, URLLC may have a higher priority than eMBB communication. Thus, a beam used for eMBB communication may be adjusted automatically by the UE/MT to reduce interference with URLLC. The priority may be defined based on the usage of the different channels and signal types that may have different priorities. For example, the priority may be defined based on whether a communication is for PDCCH, PDSCH, PUCCH, PUSCH, SRS, scheduling request (SR), SSB, or CSI-RS.

In certain aspects, priority may be defined based on the type of node involved in the communication. For example, a parent-node may have a higher priority than an IAB-node. Priority may be defined based on the scheduling mode used to schedule a particular communication. For example, a communication scheduled using dynamic scheduling (e.g., via DCI) may have higher priority than semi-static scheduling (e.g., via RRC signaling).

In certain aspects, priority may be defined based on the resource type. For example, the priority may be set based on whether flexible resources are used (e.g., resources that can be used for either DL or UL) or resources that are designated for one of UL and DL communication, or whether the resources are soft or hard resources. A hard resource is available to an IAB-node in the configured transmission direction(s) without the IAB node having to consider the impact on corresponding MT resources. In contrast to hard resources, a soft resource may only be used if it does not impact the MT's ability to transmit or receive according to its configuration and scheduling. In some cases, priority may be defined based on the communication direction, as described herein. For example, UL signaling may have a higher priority than DL signaling.

Figure 10:
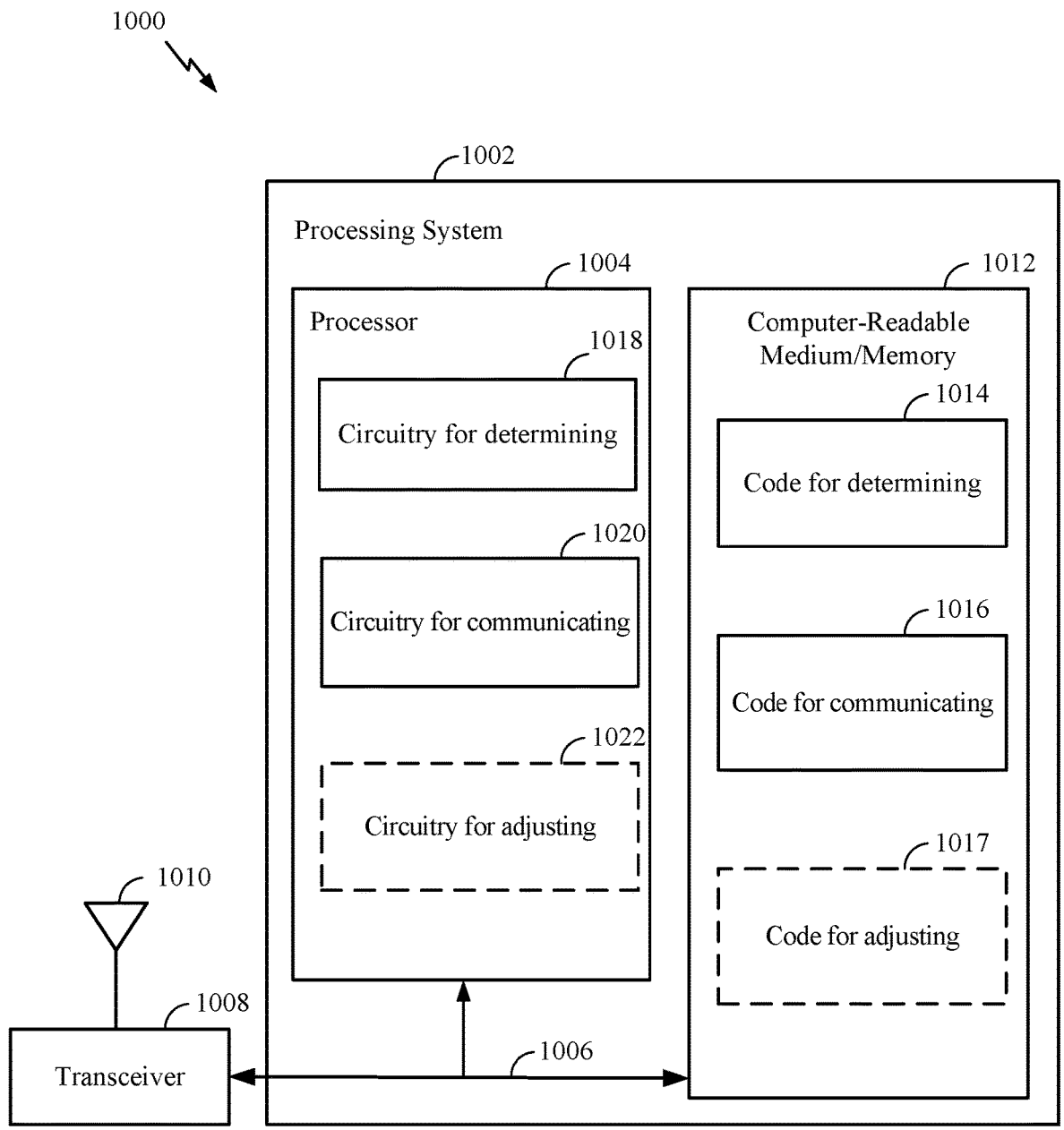
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 9. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 9, or other operations for performing the various techniques discussed herein for configuring beamforming. In certain aspects, computer-readable medium/memory 1012 stores code 1014 (e.g., an example of means for) for determining; code 1016 (e.g., an example of means for) for communicating (e.g., transmitting or receiving); and optionally, code 1017 (e.g., an example of means for) for adjusting. In certain aspects, the processor 1004 has circuitry configured to implement the code stored in the computer-readable medium/memory 1012.

In certain aspects, the processor 1004 has circuitry configured to implement the code stored in the computer-readable medium/memory 1012. The processor 1004 includes circuitry 1018 (e.g., an example of means for) for determining; circuitry 1020 (e.g., an example of means for) for communicating; and optionally, circuitry 1022 (e.g., an example of means for) for adjusting.

The transceiver 1008 may provide a means for receiving information such as packets, user data, or control information associated with various information channels (e.g., control channels, data channels, etc.). Information may be passed on to other components of the device 1000. The transceiver 1008 may be an example of aspects of the transceiver 254 described with reference to FIG. 2. The antenna 1010 may correspond to a single antenna or a set of antennas. The transceiver 1008 may provide means for transmitting signals generated by other components of the device 1000.

The configuration manager 112, 122 may support wireless communication in accordance with examples as disclosed herein. The configuration managers 112, 122 may be an example of means for performing various aspects described herein. The configuration manager 112, 122, or their sub-components, may be implemented in hardware (e.g., in control signaling management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the configuration manager 112, 122, or their sub-components, may be implemented in code (e.g., as control signaling management software or firmware) executed by a processor, or any combination thereof. If implemented in code executed by a processor, the functions of the configuration manager 112, 122, or their sub-components may be executed by a general-purpose processor, a DSP, an ASIC, a FPGA, or other programmable logic device.

In some examples, the configuration manager 112, 122 may be configured to perform various operations (e.g., receiving, transmitting, monitoring, generating) using or otherwise in cooperation with the transceiver 1008.

The configuration manager 112, 122, or their sub-components, may be physically located at various positions, including being distributed such that portions of functions are implemented at different physical locations by one or more physical components. In some examples, the configuration manager 112, 122, or their sub-components, may be a separate and distinct component in accordance with various aspects of the present disclosure. In some examples, configuration manager 112, 122, or their sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Aspect 1. A method for wireless communication by a wireless node, comprising: determining a communication mode to be used for communication by the wireless node, wherein the determining of the communication mode includes determining whether the communication is associated with multiple simultaneous communications with one or multiple other wireless nodes; determining a beamforming configuration to be used for the communication based on the communication mode; and communicating in accordance with the communication mode using the beamforming configuration.

Aspect 2. The method of aspect 1, further comprising adjusting a previous beamforming configuration based on the determined beamforming configuration to be used for the communication.

Aspect 3. The method of any one of aspects 1-2, wherein the determining the communication mode comprises determining whether the communication comprises the multiple simultaneous communications with the one or multiple other wireless nodes using the same frequency band.

Aspect 4. The method of any one of aspects 1-3, wherein the determining the communication mode is based on at least one of allocated resources for the communication, received scheduling grant for the communication, a slot format configuration for the communication, or any combination thereof.

Aspect 5. The method of any one of aspects 1-4, wherein determining the communication mode comprises determining one of a full-duplex mode of communication or a half-duplex mode of communication.

Aspect 6. The method of any one of aspects 1-5, wherein determining the communication mode comprises determining that the communication comprises the multiple simultaneous communications.

Aspect 7. The method of aspect 6, wherein determining the communication mode comprises determining that the communication comprises the multiple simultaneous communications with the multiple other wireless nodes using the same frequency band.

Aspect 8. The method of aspect 7, wherein the multiple other wireless nodes are parent nodes of the wireless node.

Aspect 9. The method of any one of aspects 7-8, wherein the multiple other wireless nodes are a parent node of the wireless node and a child node of the wireless node.

Aspect 10. The method of any one of aspects 6-9, wherein the determination of the beamforming configuration is further based on a type of the multiple simultaneous communications.

Aspect 11. The method of aspect 10, wherein the type of the multiple simultaneous communications comprises simultaneous transmissions to the one or multiple other wireless nodes.

Aspect 12. The method of any one of aspects 10-11, wherein the type of the multiple simultaneous communications comprises simultaneous receptions from the one or multiple other wireless nodes.

Aspect 13. The method of any one of aspects 10-12, wherein the type of the multiple simultaneous communications comprises simultaneous transmissions to a first subset of the multiple other wireless nodes and simultaneous receptions from a second subset of the multiple other wireless nodes.

Aspect 14. The method of aspect 13, wherein at least one of the multiple other wireless nodes is common to both the first subset and the second subset.

Aspect 15. The method of any one of aspects 6-14, wherein the beamforming configuration is further determined based on a rule configured at the wireless node, and wherein the rule indicates a priority associated with each of the multiple simultaneous communications.

Aspect 16. The method of aspect 15, wherein each of the multiple simultaneous communications is associated with a configuration for beamforming, the method further comprising adjusting the configuration for beamforming associated with one of the multiple simultaneous communications based on the determined beamforming configuration if the one of the multiple simultaneous communications has a lowest of the priorities associated with the multiple simultaneous communications.

Aspect 17. The method of any one of aspects 15-16, wherein the priority associated with each of the multiple simultaneous communications comprises a priority associated with a type of each of the multiple simultaneous communications.

Aspect 18. The method of any one of aspects 15-17, wherein the multiple simultaneous communications are with different nodes, and wherein the priority associated with each of the multiple simultaneous communications comprises a priority associated with a type of the different nodes.

Aspect 19. The method of any one of aspects 15-18, wherein the priority associated with each of the multiple simultaneous communications comprises a priority associated with a scheduling mode used to schedule each of the multiple simultaneous communications.

Aspect 20. The method of any one of aspects 15-19, wherein the priority associated with each of the multiple simultaneous communications comprises a priority associated with a type of resources used for each of the multiple simultaneous communications.

Aspect 21. The method of any one of aspects 15-20, wherein the priority associated with each of the multiple simultaneous communications comprises a priority associated with whether each of the multiple simultaneous communications is a reception by the wireless node or transmission from the wireless node.

Aspect 22. The method of any one of aspects 1-21, wherein the beamforming configuration is further determined based on a rule configured at the wireless node, wherein the rule configured at the wireless node indicates a mapping of one or more beams to candidate communication modes, the determined communication mode being one of the candidate communication modes.

Aspect 23. The method of aspect 22, further comprising receiving an indication of the rule via radio resource control (RRC) signaling, medium access control (MAC)-control element (CE), downlink control information (DCI), or any combination thereof.

Aspect 24. The method of any one of aspects 1-23, wherein determining the beamforming configuration comprises determining at least one of a transmission configuration indicator (TCI), precoding matrix, or spatial relation information, or any combination thereof.

Aspect 25. The method of any one of aspects 1-24, wherein the wireless node comprises an integrated access and backhaul (IAB)-node.

Aspect 26. An apparatus comprising means for performing the method of any of aspects 1 through 25.

Aspect 27. An apparatus comprising at least one processor and a memory coupled to the at least one processor, the memory and the at least one processor being configured to perform the method of any of aspects 1 through 25.

Aspect 28. A computer readable medium storing computer executable code thereon for wireless communications that, when executed by at least one processor, cause an apparatus to perform the method of any of aspects 1 through 25.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication at a wireless node, comprising:
   determining a communication mode to be used for communication by the wireless node, wherein the determining of the communication mode includes determining whether the communication is associated with multiple simultaneous communications with one or multiple other wireless nodes;
   determining a beamforming configuration to be used for the communication based on the communication mode and an indication that maps one or more beams to the determined communication mode, wherein the indication is received in one of radio resource control (RRC) signaling, a medium access control (MAC)-control element (CE), or downlink control information (DCI); and
   communicating in accordance with the determined communication mode using the beamforming configuration.

2. The method of claim 1, further comprising adjusting a previous beamforming configuration based on the determined beamforming configuration to be used for the communication.

3. The method of claim 1, wherein the determining the communication mode further comprises determining whether the communication comprises the multiple simultaneous communications with the one or multiple other wireless nodes using a same frequency band.

4. The method of claim 1, wherein the determining the communication mode is based on at least one of allocated resources for the communication, received scheduling grant for the communication, a slot format configuration for the communication, or any combination thereof.

5. The method of claim 1, wherein the determining the communication mode further comprises determining one of a full-duplex mode of communication or a half-duplex mode of communication.

6. The method of claim 1, wherein the determining the communication mode further comprises determining that the communication includes the multiple simultaneous communications.

7. The method of claim 6, wherein the determining the communication mode further comprises determining that the communication comprises the multiple simultaneous communications with the multiple other wireless nodes using a same frequency band.

8. The method of claim 7, wherein the multiple other wireless nodes are parent nodes of the wireless node.

9. The method of claim 7, wherein the multiple other wireless nodes include a parent node of the wireless node and a child node of the wireless node.

10. The method of claim 6, wherein the determining the beamforming configuration is further based on a type of the multiple simultaneous communications.

11. The method of claim 10, wherein the type of the multiple simultaneous communications comprises simultaneous transmissions to the one or multiple other wireless nodes.

12. The method of claim 10, wherein the type of the multiple simultaneous communications comprises simultaneous receptions from the one or multiple other wireless nodes.

13. The method of claim 10, wherein the type of the multiple simultaneous communications comprises simultaneous transmissions to a first subset of the multiple other wireless nodes and simultaneous receptions from a second subset of the multiple other wireless nodes.

14. The method of claim 13, wherein at least one of the multiple other wireless nodes is common to both the first subset and the second subset.

15. The method of claim 6, wherein the beamforming configuration is further determined based on a rule configured at the wireless node, and wherein the rule indicates a priority associated with each of the multiple simultaneous communications.

16. The method of claim 15, wherein:
each of the multiple simultaneous communications is associated with a configuration for beamforming; and
the method further comprises adjusting the beamforming configuration associated with one of the multiple simultaneous communications based on the determined beamforming configuration if the one of the multiple simultaneous communications has a lowest of the priorities associated with the multiple simultaneous communications.

17. The method of claim 15, wherein the priority associated with each of the multiple simultaneous communications comprises a priority associated with a type of each of the multiple simultaneous communications.

18. The method of claim 15, wherein the multiple simultaneous communications are with different nodes, and wherein the priority associated with each of the multiple simultaneous communications comprises a priority associated with a type of the different nodes.

19. The method of claim 15, wherein the priority associated with each of the multiple simultaneous communications comprises a priority associated with a scheduling mode used to schedule each of the multiple simultaneous communications.

20. The method of claim 15, wherein the priority associated with each of the multiple simultaneous communications comprises a priority associated with a type of resources used for each of the multiple simultaneous communications.

21. The method of claim 15, wherein the priority associated with each of the multiple simultaneous communications comprises a priority associated with whether each of the multiple simultaneous communications is a reception by the wireless node or transmission from the wireless node.

22. The method of claim 1, wherein the determining the beamforming configuration comprises determining at least one of a transmission configuration indicator (TCI), precoding matrix, or spatial relation information, or any combination thereof.

23. The method of claim 1, wherein the wireless node comprises an integrated access and backhaul (IAB)-node.

24. An apparatus for wireless communication at a wireless node, comprising:
a memory; and
a processor coupled to the memory, wherein the processor is configured to:
determine a communication mode to be used for communication by the wireless node, wherein the processor is further configured to determine the communication mode by determining whether the communication comprises multiple simultaneous communications with one or multiple other wireless nodes;
determine a beamforming configuration to be used for the communication based on the determined communication mode and an indication that maps one or more beams to the determined communication mode, wherein the indication is received in one of radio resource control (RRC) signaling, a medium access control (MAC)-control element (CE), or downlink control information (DCI); and
communicate in accordance with the determined communication mode using the beamforming configuration.

25. An apparatus for wireless communication at a wireless node, comprising:
means for determining a communication mode to be used for communication by the wireless node, wherein the means for determining the communication mode includes means for determining whether the communication comprises multiple simultaneous communications with one or multiple other wireless nodes;
means for determining a beamforming configuration to be used for the communication based on the communication mode and an indication that maps one or more beams to the determined communication mode, wherein the indication is received in one of radio resource control (RRC) signaling, a medium access control (MAC)-control element (CE), or downlink control information (DCI); and
means for communicating in accordance with the determined communication mode using the beamforming configuration.

26. A non-transitory computer-readable medium having instructions stored thereon to cause a wireless node to:
determine a communication mode to be used for communication by the wireless node, wherein the instructions further cause the wireless node to determine the communication mode by determining whether the communication comprises multiple simultaneous communications with one or multiple other wireless nodes;
determine a beamforming configuration to be used for the communication based on the determined communication mode and an indication that maps one or more beams to the determined communication mode, wherein the indication is received in one of radio resource control (RRC) signaling, a medium access control (MAC)-control element (CE), or downlink control information (DCI); and
communicate in accordance with the determined communication mode using the beamforming configuration.

27. The non-transitory computer-readable medium of claim 26, wherein the instructions to cause the wireless node to determine the communication mode, further comprise instructions to cause the wireless node to determine one of a full-duplex mode of communication or a half-duplex mode of communication.

28. The non-transitory computer-readable medium of claim 26, wherein the instructions to cause the wireless node to determine the communication mode further comprise instructions to cause the wireless node to determine that the communication includes the multiple simultaneous communications.

29. The non-transitory computer-readable medium of claim 28, wherein the instructions to cause the wireless node to determine the beamforming configuration further comprise instructions to cause the wireless node to determine the beamforming configuration based on a type of the multiple simultaneous communications.

30. The non-transitory computer-readable medium of claim 29, wherein the type of the multiple simultaneous communications comprises simultaneous transmissions to the one or multiple other wireless nodes.

31. The non-transitory computer-readable medium of claim 29, wherein the type of the multiple simultaneous communications comprises simultaneous receptions from the one or multiple other wireless nodes.

32. The non-transitory computer-readable medium of claim 29, wherein the type of the multiple simultaneous communications comprises simultaneous transmissions to a first subset of the multiple other wireless nodes and simultaneous receptions from a second subset of the multiple other wireless nodes.

33. The non-transitory computer-readable medium of claim 26, wherein the wireless node comprises an integrated access and backhaul (IAB)-node.

34. The non-transitory computer-readable medium of claim 26, wherein the indication is received in the MAC-CE.

35. The apparatus of claim 24, wherein, in order to determine the communication mode, the processor is further configured to determine one of a full-duplex mode of communication or a half-duplex mode of communication.

36. The apparatus of claim 24, wherein, in order to determine the communication mode, the processor is further configured to determine that the communication includes the multiple simultaneous communications.

37. The apparatus of claim 36, wherein the processor is further configured determine the beamforming configuration based on a type of the multiple simultaneous communications.

38. The apparatus of claim 37, wherein the type of the multiple simultaneous communications comprises simultaneous transmissions to the one or multiple other wireless nodes.

39. The apparatus of claim 37, wherein the type of the multiple simultaneous communications comprises simultaneous receptions from the one or multiple other wireless nodes.

40. The apparatus of claim 37, wherein the type of the multiple simultaneous communications comprises simultaneous transmissions to a first subset of the multiple other wireless nodes and simultaneous receptions from a second subset of the multiple other wireless nodes.

41. The apparatus of claim 24, wherein the wireless node comprises an integrated access and backhaul (IAB)-node.

42. The apparatus of claim 24, wherein the indication is received in the MAC-CE.

43. The apparatus of claim 25, wherein the means for determining the communication mode comprise means for determining one of a full-duplex mode of communication or a half-duplex mode of communication.

44. The apparatus of claim 25, wherein the means for determining the communication mode further comprise means for determining that the communication includes the multiple simultaneous communications.

45. The apparatus of claim 44, wherein the means for determining are configured to determine the beamforming configuration based on a type of the multiple simultaneous communications.

46. The apparatus of claim 45, wherein the type of the multiple simultaneous communications comprises simultaneous transmissions to the one or multiple other wireless nodes.

47. The apparatus of claim 45, wherein the type of the multiple simultaneous communications comprises simultaneous receptions from the one or multiple other wireless nodes.

48. The apparatus of claim 45, wherein the type of the multiple simultaneous communications comprises simultaneous transmissions to a first subset of the multiple other wireless nodes and simultaneous receptions from a second subset of the multiple other wireless nodes.

49. The apparatus of claim 25, wherein the wireless node comprises an integrated access and backhaul (IAB)-node.

50. The apparatus of claim 25, wherein the indication is received in the MAC-CE.

51. The method of claim 1, wherein the indication is received in the MAC-CE.

* * * * *